US009311678B2

(12) United States Patent
He et al.

(10) Patent No.: US 9,311,678 B2
(45) Date of Patent: Apr. 12, 2016

(54) COMMENT PLUG-IN FOR THIRD PARTY SYSTEM

(75) Inventors: Ray C. He, Mountain View, CA (US); Austin Haugen, San Francisco, CA (US); Catherine Cissy Lee, Mountain View, CA (US); Evan Sharp, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 632 days.

(21) Appl. No.: 12/969,368

(22) Filed: Dec. 15, 2010

(65) Prior Publication Data

US 2012/0159635 A1    Jun. 21, 2012

(51) Int. Cl.
*H04L 29/00* (2006.01)
*G06Q 50/00* (2012.01)
*G06F 21/62* (2013.01)

(52) U.S. Cl.
CPC ............ *G06Q 50/01* (2013.01); *G06F 21/6245* (2013.01)

(58) Field of Classification Search
USPC ............................................ 709/206; 726/26
See application file for complete search history.

(56) References Cited

U.S. PATENT DOCUMENTS

| 7,409,362 | B2 | 8/2008 | Calabria | |
|---|---|---|---|---|
| 7,620,636 | B2 | 11/2009 | Fasciano | |
| 7,831,928 | B1 | 11/2010 | Rose | |
| 8,250,145 | B2 * | 8/2012 | Zuckerberg et al. | 709/204 |
| 8,538,978 | B2 * | 9/2013 | Rakshit | 707/767 |
| 8,621,011 | B2 * | 12/2013 | Bland et al. | 709/206 |
| 2004/0220963 | A1 | 11/2004 | Chen | |
| 2006/0218179 | A1 | 9/2006 | Gardner | |
| 2007/0214121 | A1 | 9/2007 | Ebanks | |
| 2008/0228762 | A1 | 9/2008 | Tittizer | |
| 2008/0255977 | A1 | 10/2008 | Altberg | |
| 2008/0288277 | A1 | 11/2008 | Fasciano | |
| 2009/0129596 | A1 | 5/2009 | Chavez | |
| 2009/0199104 | A1 | 8/2009 | Pluschkell | |
| 2009/0248516 | A1 | 10/2009 | Gross | |
| 2010/0023584 | A1 * | 1/2010 | Kamdar et al. | 709/206 |
| 2010/0106542 | A1 | 4/2010 | Green | |
| 2011/0041075 | A1 | 2/2011 | Cierniak | |
| 2011/0231240 | A1 * | 9/2011 | Schoen et al. | 705/14.41 |
| 2011/0251970 | A1 * | 10/2011 | Oien et al. | 705/319 |
| 2012/0079004 | A1 * | 3/2012 | Herman | 709/203 |
| 2012/0158753 | A1 | 6/2012 | hE | |

FOREIGN PATENT DOCUMENTS

WO      WO 2011/019295      2/2011

OTHER PUBLICATIONS

Office Action for U.S. Appl. No. 13/969,408, Feb. 29, 2012.
Alyssa, "Diligently Dining. Lose the Loonies and Find the Foodies (or How to Read Yelp Reviews)," http://diligentlydining.blogspot.com/2009/08/lose-loonies-and-find-foodies-or-how-to.html, Downloaded Feb. 24, 2012.
Office Action for U.S. Appl. No. 13/969,408, Aug. 2, 2012.
U.S. Appl. No. 12/969,408, Oct. 2, 2013 Non-Final Office Action.
U.S. Appl. No. 12/969,408, Feb. 1, 2013 Amendment and Request for Continued Examination (RCE).

* cited by examiner

*Primary Examiner* — Jeffrey Pwu
*Assistant Examiner* — Michael D Anderson
(74) *Attorney, Agent, or Firm* — Baker Botts L.L.P.

(57) ABSTRACT

In one embodiment, a user comment system receives a user comment associated with a content object, assigns one or more privacy settings to the user comment, and stores the user comment in a data store in association with an identifier unique to the content object.

27 Claims, 10 Drawing Sheets comment #1
thread identifier: www.example.com/article_1234 — 330
content: <text string>
date: <time stamp>
author: <text string>
author profile picture: <image> comment #2
thread identifier: www.example.com/article_5678 — 330
content: <text string>
date: <time stamp>
author: <text string>
author profile picture: <image> comment #3
thread identifier: www.example.net/article_12 — 330
content: <text string>
date: <time stamp>
author: <text string>
author profile picture: <image> comment #4
thread identifier: www.example.com/article_1234 — 330
content: <text string>
date: <time stamp>
author: <text string>
author profile picture: <image>

COMMENT PLUG-IN FOR THIRD PARTY SYSTEM

TECHNICAL FIELD

The present disclosure relates generally to a user comment system and, more particularly, to synchronization and moderation of user comments.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system.

Users of a web site may post comments to contents of the web site. The web site may store user comments as well as moderate user comments such as deleting user comments determined to be irrelevant or inappropriate.

SUMMARY

Particular embodiments relate to a user comment system that assigns one or more privacy settings to a user comment associated with a content object hosted by a third party system, and stores the user comment in a data store of user comments in association with an identifier for the content object. These and other features, aspects, and advantages of the disclosure are described in more detail below in the detailed description and in conjunction with the following figures.

BRIEF DESCRIPTION OF THE DRAWINGS

FIG. 3 and FIG. 3A illustrate example data structures of user comments stored in a comment data store.

FIGS. 4A, 4B, and 4C illustrate an example of synchronization of user comments between the social networking system and a third party website.

DETAILED DESCRIPTION

Figure 1:
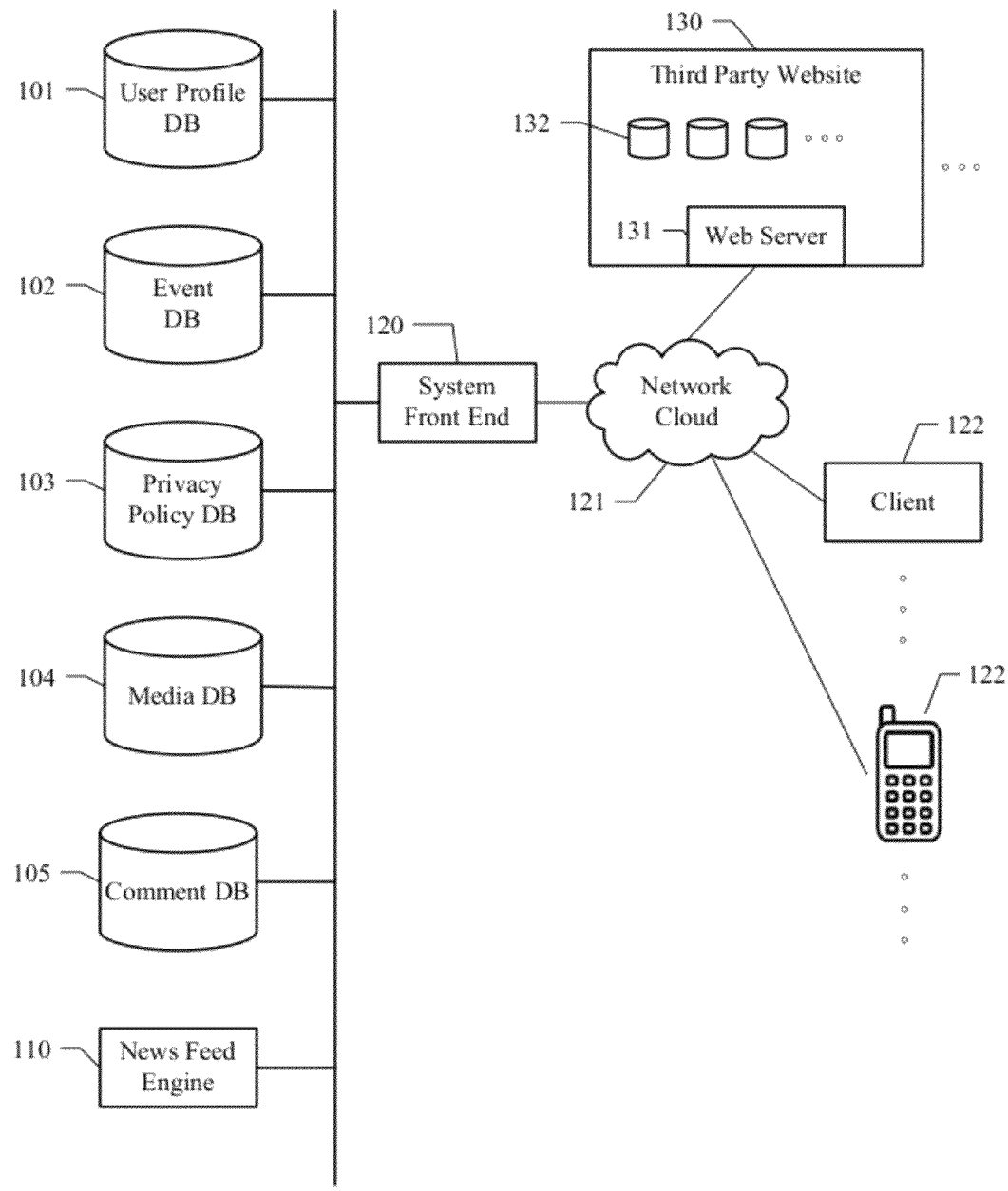
FIG. 1 illustrates an example social networking system.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data.

A social networking system may support a news feed service. A news feed is a data format typically used for providing users with frequently updated content. A social networking system may provide various news feeds to its users, where each news feed includes content relating to a specific subject matter or topic, and/or other users. Various pieces of content may be aggregated into a single news feed. In some implementations, a social networking system may provide a news feed that includes selected entries corresponding to activities of a user's first-degree contacts and/or pages or topics that a user has indicated an interest. Individual users of the social networking system may subscribe to specific news fees of their interest. U.S. Pat. No. 7,669,123, incorporated by reference in its entirety for all purposes, describes a system that can be used to dynamically provide a news feed. A group of related actions may be presented together to a user of the social networking system in the same news feed. For example, a news feed concerning the event organized through the social networking system may include information about the event, such as its time, location, and attendees, and photos taken at the event, which have been uploaded to the social networking system. U.S. application Ser. No. 12/884,010, incorporated by reference in its entirety for all purposes, describes a system that can be used to construct a news feed comprising related actions and present the news feed to a user of the social networking system.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. In particular embodiments, the social networking system may store user privacy policy data in privacy policy database 103. In particular embodiments, the social networking system may store media data (e.g., photos, or video clips) in media database 104. In particular embodiments, databases 101, 102, 103, and 104 may be operably connected to the social networking system's front end 120 and news feed engine 110. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, a user of the social networking system may upload one or more media files to media database 104. For example, a user can upload a photo or a set of photos (often called a photo album), or a video clip to media database 105 from a client device 122 (e.g., a computer, or a camera phone). In particular embodiments, the one or more media files may contain metadata (often called "tags") associated with each media file. For example, a photo shot by a digital camera may contain metadata relating to file size, resolution, time stamp, name of the camera maker, and/or location (e.g., GPS) coordinates. A user can add additional metadata values to a photo, or tag a photo, during an upload process. Some examples of tags of a media file are author, title, comments, event names, time, location, names of people appearing in the media file, or user comment. In particular embodiments, a user may tag a media file by using a client application (e.g., a photo or video editor), or entering one or more tags in a graphical user interface of a media uploading tool that uploads a user's one or more media files from a client device 122 to the social networking system. A user may also tag a media file after an upload at a later time in the social networking system's web site. In particular embodiments, the social networking system may also extract metadata from a media file and store the metadata in media database 104.

In particular embodiments, news feed engine 110 may access user profile database 101, event database 102, and media database 104 for data about a particular user of the social networking system, and assemble a list of one or more activities as news items for a user or a set of users. In particular embodiments, news feed engine 110 may access privacy policy database 103 and determines a subset of news items based on one or more privacy settings. In particular embodiments, news feed engine 110 may compile a dynamic list of a limited number of news items in a ranked or sorted order. In particular embodiments, news feed engine 110 may provide links related to one or more activities in the news items, and links providing opportunities to participate in the activities. For example, a news feed can comprise wall posts, status updates, comments, and recent check-ins to a place (with a link to a web page of the place).

In other embodiments, news feed engine 110 may access user profile database 101, event database 102, and media database 104 and compile a dynamic list of a limited number of news items about a group of related actions received from users of the social networking system (i.e., a news feed). For example, a news feed can comprise an event that a user may schedule and organize through the social networking system (with a link to participate the event), messages about the event posted by the user and other participants of the event, and photos of the event uploaded by the user and other participants of the event.

Users of a social networking system can access other websites or third party websites (e.g., ESPN.com, www.youtube.com). In particular embodiments, a user using client device 122 may connect to and communicate with third party website 130 through network cloud 121. Third party website 130 may comprise web server 131 operatively connected to one or more data stores 132 storing user data and web page information. User data may include, for example, user name, user profile picture, and user profile information (e.g., location, affiliation, interest). Web page information may include, for example, page layout information, scripts, web page content such as text (e.g., ASCII or HTML), media data (e.g., graphics, photos, video clips), and executable code objects (e.g., a game executable within a browser window or frame). In particular embodiments, a user may use a web browser or special-purpose client application hosted on client device 122 to access their party website 130 by sending an HTTP request to web server 131, causing web server 131 to access the one or more data stores 132 and construct one or more web pages or frames displayed in the web browser or the special-purpose client application.

A social networking system may communicate and access third party website 130, and vise versa, through network cloud 121. For example, a web page constructed by third party website 130 for a user of a social networking system can contain information from the social networking system, such as a frame displaying profile pictures of the user's first-degree friends who are currently active on third party website 130. For example, a user's user profile page of a social networking system can contain an embedded video clip that the user posted on third party website 130. In some embodiments, a web page constructed by a first web site may include one or more inline references that cause the client device 122 to access and display content from a second website by incorporating in the web page's HTML document Uniform Resource Locations (URLs) and/or script code (e.g., JavaScript, PHP, AJAX) that causes a client application hosted on the client device 122 to access the second website to dynamically provide content specified by the script code (e.g., profile pictures). In some embodiments, a browser cookie installed by a second website on client device 122 can be used to facilitate accessing the second website. For example, requests transmitted to the social networking system for a particular user may include a browser cookie or other token to enable automatic authentication and access to the social networking system for the particular user (e.g., to access and display profile pictures of the particular user's first-degree friends), without the particular user having to manually enter user ID and password information of the social networking system.

Figure 2:
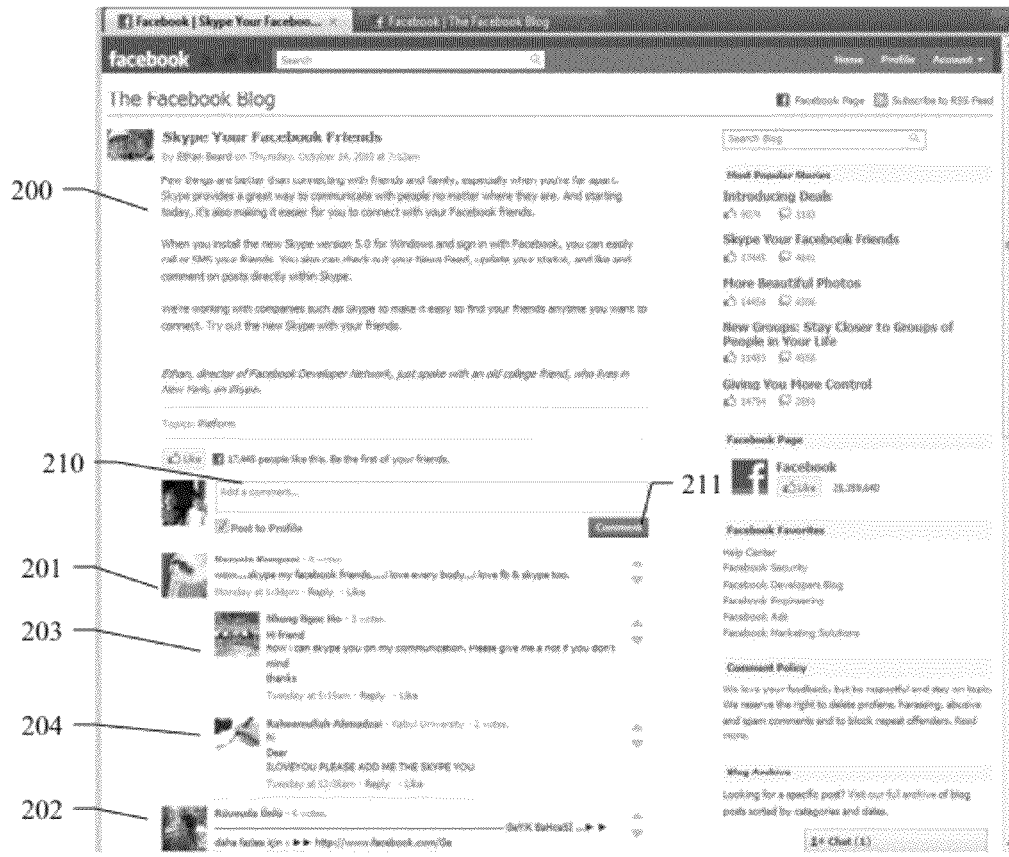
FIG. 2 illustrates an example web page of an article and associated comments.

Individuals viewing a web page containing particular web content (e.g., an article, a blog post, a photo, a video clip, etc.) can post one or more comments about the particular content on the web page. FIG. 2 illustrates an example web page of an article and associated comments. In the example of FIG. 2, the web page displays comments 201 and 202 about an article (a blog) 200, and in-line comments 203 and 204 responding to comment 201. A viewer of the web page can add a new comment in comment box 210 and select post comment icon 211 to submit the new comment, causing all or part of the web page to refresh and update with the new comment by the viewer. Ordinarily, third party website 130 stores comments in the one or more data stores 132, and displays comments in chronological order (e.g., most recent is displayed first) in a web page. However, comments on the top of the list in a web page may not be most relevant to a viewer of the web page. Particular embodiments herein describe methods in that a social networking system hosts a user comment system for a third party website, and presents user comments to a first user based on the first user's social graph information and, in some instances, one or more privacy settings. Particular embodiments herein can be implemented by a comment hosting process hosted by one or more computing devices of the social networking system.

In particular embodiments, a user comment may be a comment associated with particular web content in a web page constructed by third party website 130. For example, a comment associated with an article can be a comment made by a first person to the article, and can be a comment made by a second person to the article, and can be a comment made by a third person to the comment made by the first person to the article. In particular embodiments, a user comment may comprise content information and author information. For example, content information can be content of the comment (e.g., a text string) and a time stamp. Author information can be a name of the author of the user comment (e.g., a user name, a screen name, etc.) and a profile picture of the author. In some instances, if an author of a user comment prefers to remain anonymous, or information about the author is not available, a default name (e.g. "anonymous user") and a default profile picture may be assigned to the user comment. In particular embodiments, a user comment may further comprise review information. For example, review information can be how many up or down votes the user comment has received from viewers of the user comment. For example, review information can be how many "like" counts the user comment had received from viewers of the user comment. For example, review information can also include the author's reputation score derived from votes, likes or other feedback received by other users across a set of comments (e.g., an author can be a popular commentator if he has received positive reviews in ten other comments he made). In particular embodiments, a user comment may further comprise or be associated with one or more privacy settings.

Figure 3:
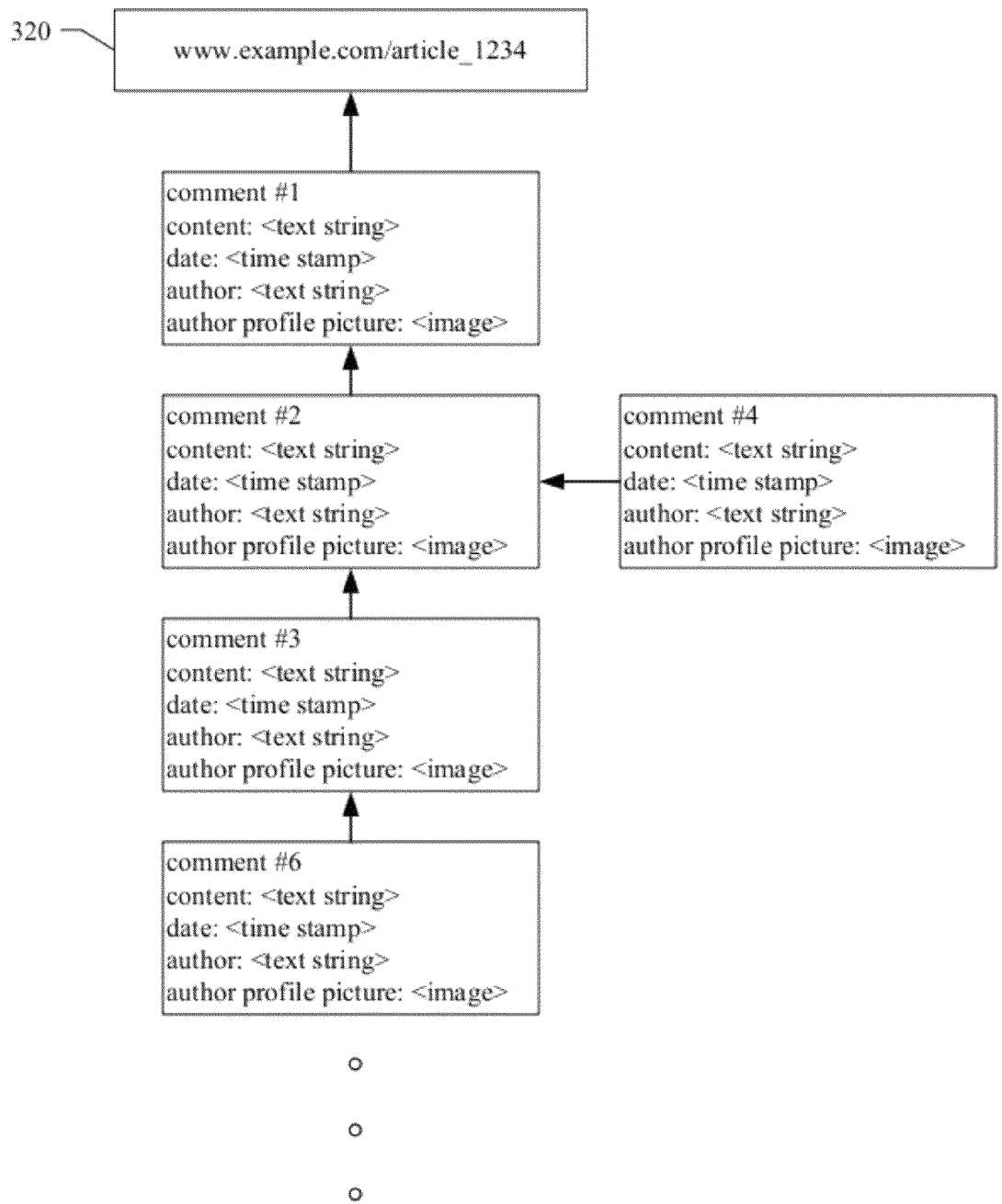

In particular embodiments, the comment hosting process may store one or more user comments associated with the particular web content in comment database 105 illustrated in FIG. 1. In particular embodiments, comment database 105 may be operably connected to system front end 120, and news feed engine 110. In particular embodiments, the comment hosting process may store and access user comments based on a common thread comprising one or more user comments associated with the same web content. In some embodiments, the comment hosting process may store and access user comments based on a unique thread identifier. For example, a thread identifier can be a combination of URL address of third party website 130 and a web content identifier for the particular web content. FIG. 3 illustrates an example data structure of user comments stored in a comment data store. In the example of FIG. 3, user comments to a web content "article_1234" at web site "www.example.com" are programming objects linked to a common thread identifier "www.example.com/article_1234" (320), and each programming object can comprise content information (e.g., a text string, a time stamp), author information (e.g., a name, a user profile picture thumbnail), review information (e.g., up/down vote count), and/or one or more privacy settings. Another example data structure of user comments stored in a comment data store can be each comment object containing a thread identifier field 330 as illustrated in FIG. 3A. In such an implementation, the comment hosting process can store and access the comment objects based on a value of the thread identifier field.

In particular embodiments, the comment hosting process may add/adjust one or more privacy settings of a user comment stored in comment database 105 based on the user comment author's privacy settings stored in user profile database 101. For example, a first user can configure and store in user profile database 101 a particular privacy setting for his comments on any web content of third party website 130 as only viewable to his first- and second-degree friends. The comment hosting process can add the particular privacy setting to a user comment made by the first user at third party website 130 when storing the user comment in comment database 105. In other embodiments, the comment hosting process may apply a default privacy setting to a user comment that is global to social networking system, e.g., viewable to everyone.

Figure 4:
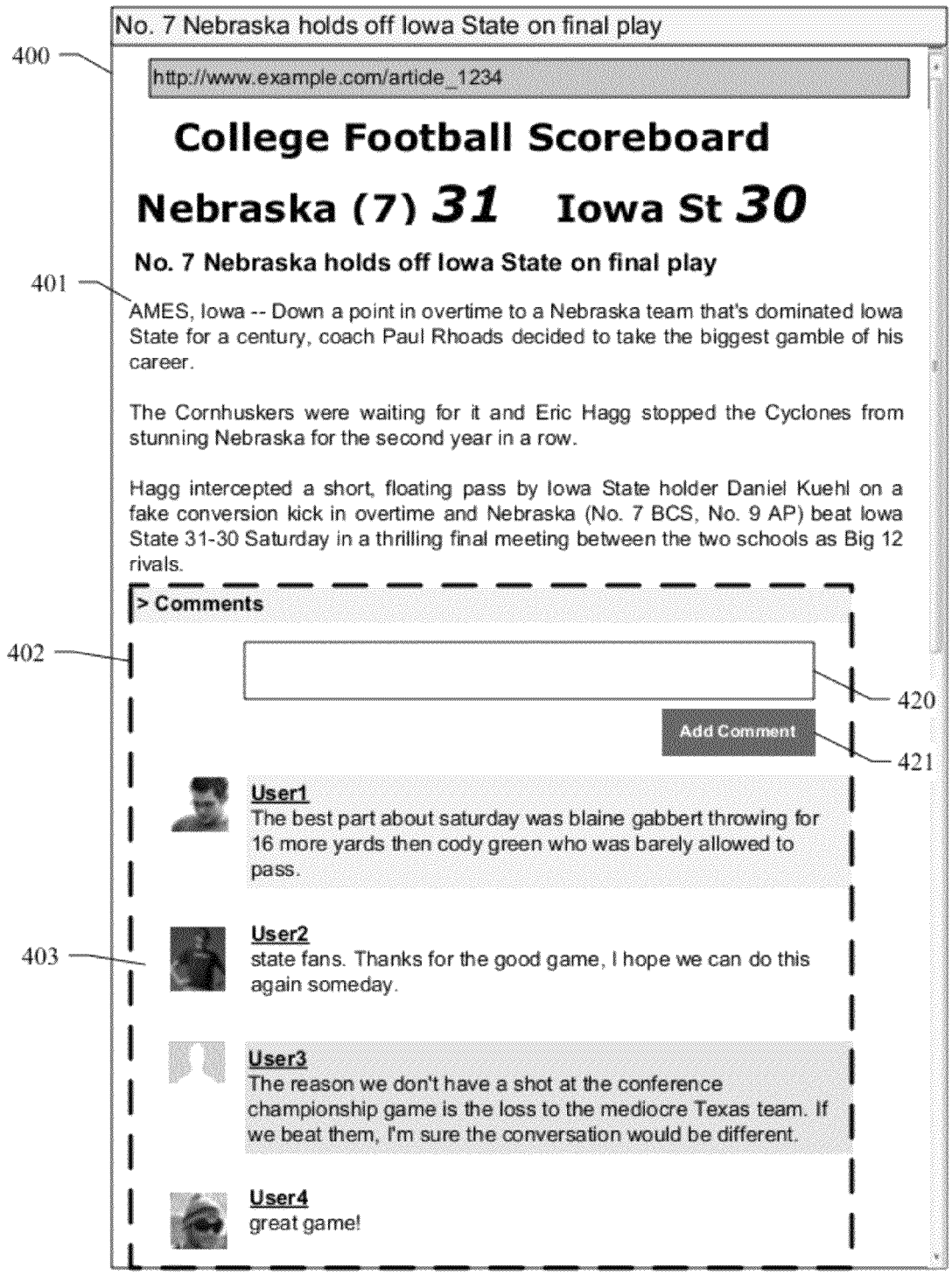
FIG. 4 illustrates an example web page using an inline frame for user comments.

In particular embodiments, web server 131 of third party website 130 may include in structured documents transmitted to client applications HTML or other code objects that cause the client applications to transmit requests to the comment hosting process for user comments associated with the particular web content. The request causes the comment hosting process to access comment database 105 and provide the requested user comments. For example, web server 131 may construct a web page containing the particular web content and the requested user comments associated with the particular web content. In some embodiments, web server 131 may construct a web page of the particular web content (e.g., an article, a photo, or a video clip), including an inline frame for user comments associated with the particular web content by using an HTML iframe tag referencing social networking system and a unique identifier for the particular web content or comment thread. FIG. 4 illustrates an example web page using an inline frame for user comments. In the example of FIG. 4, web server 131 of website "www.example.com" constructs a web page 400 in HTML of an article about a college football game (401), including an inline frame 402 using a HTML iframe tag referencing the social networking system and a unique identifier for the article www.example.com/article_1234, such as:

```
<iframe
    src="http://www.facebook.com/comment.php?href=http://www.example.com/article_1234
        width="600px">
</iframe>
```

The foregoing iframe element causes a client application hosted on a client device 122 to transmit a request causing the comment hosting process to access comment database 105 based on the unique identifier. The comment hosting process provides a response including user comments associated with the article to be displayed in the inline frame. In some implementations, the response also includes Asynchronous JavaScript and XML (AJAX) code, or alternatively a combination of JavaScript and JavaScript Object Notation (JSON) code, that allows users to post comments, either new comments and/or in-line replies to existing comments. For example, an individual can add an additional comment by entering a text string in comment box 420 and selecting Add Comment icon 421. The AJAX or JSON code of the inline frame transmits a message to social networking system, causing comment hosting process to store the additional comment in comment database 105 and refresh content in inline frame 402 to include the additional comment. In some implementations, the user viewing the content and submitting comments can be identified based on browser cookies including a user identifier that are appended to various requests transmitted to social networking system. As discussed below, the comment hosting process, when receiving a comment, may also configure a news feed item for processing by news feed engine 110. Still further, the comment entry interface may also allow a user to configure a privacy setting for that particular comment or all comments of the user associated with the particular web content. For example, the user may specify that only a custom set of users can access the content, or that only those users having a first degree relationship can see the comment whether in a news feed item or displayed in connection with the third party web site. If no particular privacy setting is configured, the comment hosting process may apply a default setting that is global to social networking system or a default specified by the user and stored with the user's profile information.

Additionally, a user's comment about the particular web content at third party website 130 may appear in the user's news feed in the social networking system, or in a news feed of a friend of the user in the social networking system. The news feed object may include a short snippet of the particular content, a thumbnail image, and a hypertext link to the particular content hosted by third party website 210. In addition, comments to the news feed at the social networking system about the particular web content and comments to the particular web content at third party website 130 may be synchronized since the comments are stored in the same comment database 105. In some instances, the comments are stored based on the same unique thread identifier as described above. In particular embodiments, news feed engine 110 may access comment database 105 to include in a news feed one or more comments made by the first user, or by a first-degree friend of the first user, about the particular web content at third party websites 130. In particular embodiments, the first user or a second user, when viewing the comments thread from a news feed, may add one or more additional comments about the particular web content by adding the additional comments to the news feed item, causing news feed engine 110 to store the additional comments about the particular web content in comment database 105. In particular embodiments, news feed engine 110 may access comment database 105 and include the additional comments about the particular web content in the news feed. In particular embodiments, web server 131 may construct a web page containing the particular web content and associated user comments, causing the comment hosting process to access comment database 105 for user comments associated with the particular web content, including the additional comments made by the first user or the second user to the news feed item. Accordingly, the comment thread for a particular web content item may include comments entered in connection with the third party web site and the social networking system.

Figure 4A:
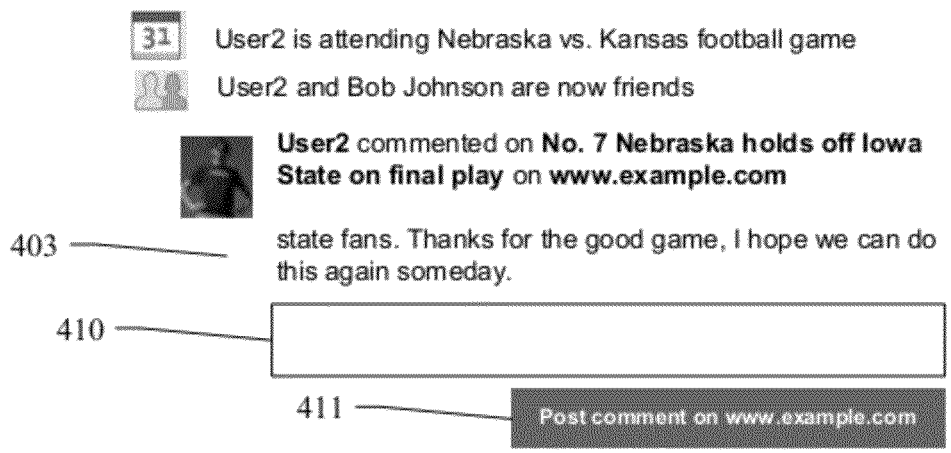
Figure 4B:
Figure 4C:
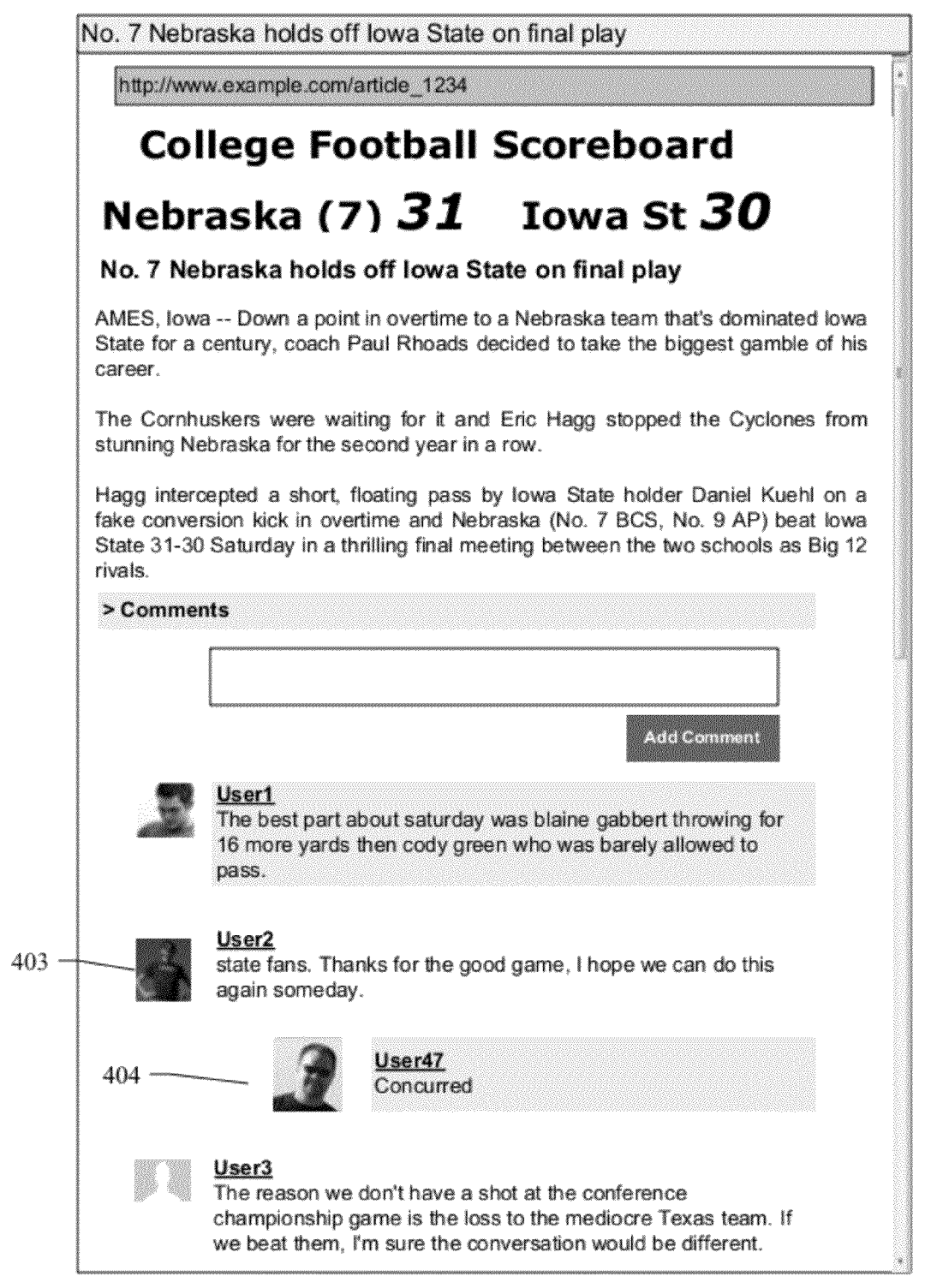

FIGS. 4A, 4B, and 4C, in addition to FIG. 4, illustrate example synchronizations of user comments between the social networking system and a third party website. For example in FIG. 4, a first user "user2" posts comment 403 to an article about a college football game (401) in a third party website "www.example.com", causing the comment hosting process to store comment 403 in comment database 105. News feed engine 110 can access comment database 105 to include comment 403 and information about the article (e.g., title and web site of the article) in the first user's news feed, as illustrated in FIG. 4A. For example, a second user can add a comment to the article by typing in his comment in comment box 410 and selecting a submit icon 411 ("Post comment to www.example.com") in the news feed (e.g., on the first user's user profile page), causing news feed engine 110 to store the second user's comment in comment database 105, and display the second user's comment (404) in the news feed, as illustrated in FIG. 4B. Web server 131 may refresh the web page in FIG. 4, causing the comment hosting process to access comment database 105 and updating the user comment inline frame 402 including the second user's comment 404, as illustrated in FIG. 4C.

Particular embodiments described above on synchronization of user comments associated with a same web content may not be limited to the social networking system and a third party website. Two or more websites may share particular web content, for example, multiple newspapers can share a news article provided by a news service agency (e.g., Reuters). In particular embodiments, two or more websites may synchronize user comments for a particular web content by storing and accessing user comments for the particular web content in comment database 105 using the same comment identifier.

Figure 5:
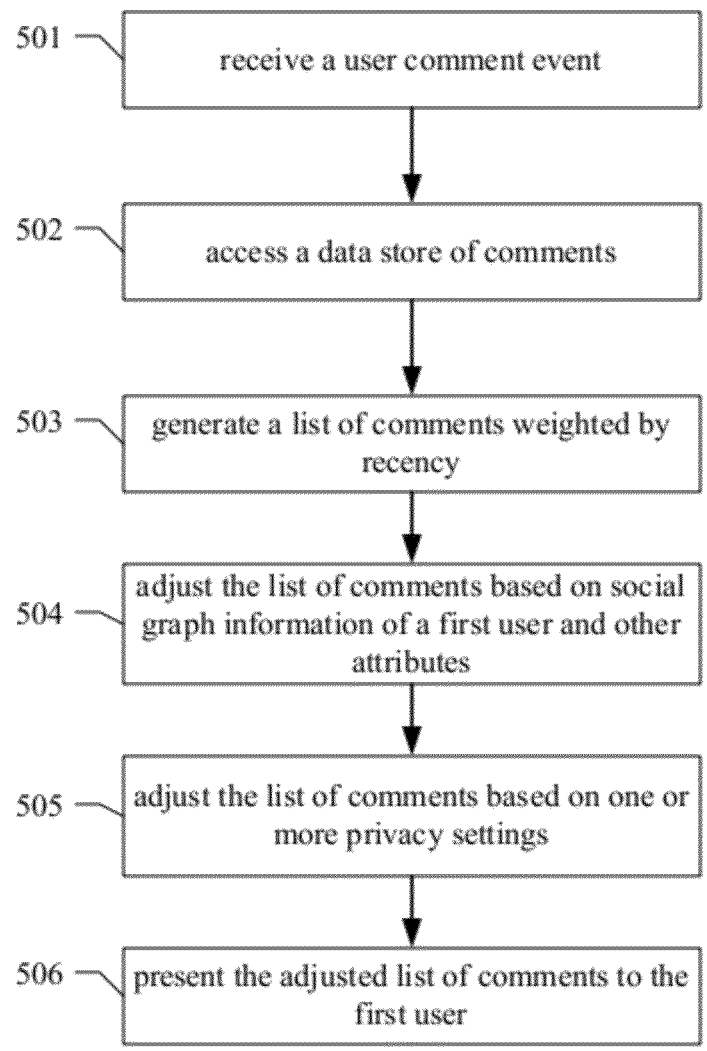
FIG. 5 illustrates an example method of ordering user comments.

FIG. 5 illustrates an example method of ordering user comments based on social graph information and privacy settings. The ordering process may be initiated when a request for comments including a comment thread identifier is received by the comment hosting process. In particular embodiments, the comment hosting process may receive a user comment event for the particular web content (501). For example, a user comment event can be a user request for comments associated with a particular content of third party website 131. Another user comment event can be that news feed engine 110 constructs a news feed of a particular user, including user comments on the particular web content by the particular user and other users. For example, a user comment event can be that a new user comment about the particular web content is submitted at the web page containing the particular web content and/or existing user comments associated with the particular web content. In particular embodiments, the comment hosting process may access comment database 105 for user comments associated with the particular web content (502).

In particular embodiments, the comment hosting process may generate a list of user comments weighted by recency (503). For example, the comment hosting process can generate the list of user comments from all user comments associated with the particular web content, and place the comments in the list in chronological order (e.g., most recent first). In particular embodiments, the comment hosting process may adjust the list of user comments based on social graph information of a first user associated with the request (504). As discussed above, the first user may be identified in a browser cookie appended to the request. In particular embodiments, the comment hosting process may access user profile database 101 and adjust the order of the list of user comments based on social graph information of the first user. For example, the comment hosting process can place comments from the first user's first-degree friends at the beginning of the list of user comments. In particular embodiments, the comment hosting process may further adjust the order of the list of user comments based on user attributes (e.g., locality, trustworthiness, affiliation) and comment attributes (e.g. voting reputation). In some embodiments, the comment hosting process may assign a weighting score to each of the user comments in the list of user comments based on social graph information, user attributes and comment attributes. For example, the comment hosting process can assign a weighting score of 1.0 to comments made by the first user's first-degree friends. The comment hosting process can assign a weighting score of 0.5 to comments made by users in the same neighborhood (i.e., Sunset District, San Francisco, Calif.) as the first user. For example, the comment hosting process can assign a weighting score of 0.8 to comments made by users with the same affiliation as the first user or close affinity to the first user (e.g., went to the same collage during the same school year). A system for measuring user affinity is described more generally in U.S. patent application Ser. No. 11/503,093, filed on Aug. 11, 2006, which is hereby incorporated by reference in its entirety and for all purposes. For example, the comment hosting process can assign a weighting score of 0.7 to comments made by users having a high level of trustworthiness or a reputation score above a threshold. An example process of determining the level of trustworthiness of a user based on user actions is described more generally in U.S. patent application Ser. No. 11/701,744 filed on Feb. 2, 2007, which is hereby incorporated by reference in its entirety and for all purposes. The comment hosting process can assign a weighting score of 0.8 to comments with positive voting reputation (e.g., more up votes than down votes). For example, the comment hosting process can assign a default weighting score (e.g., 0.2) to rest of the comments in the list of user comments. In some embodiments, the comment hosting process may adjust the order of the list of user comments based on the weighting score of each comment, for example, ranking comments with higher weighting scores ahead of comments with lower weighting scores.

In particular embodiments, the comment hosting process may adjust the list of user comments based on one or more privacy settings (505). For example, the comment hosting process may access user profile database 101, determine one or more privacy settings for each comment of the list of user comment (e.g., as set by each comment's author), identify one or more comments that the first user does not have permission to access based on the privacy settings of the commenting users, and remove the one or more identified comments from the list of user comments. As discussed above, one or more of the comments may include privacy settings specifically configured for the user comment.

In particular embodiments, the comment hosting process may present the adjusted list of user comments to the first user (506). For example, the comment hosting process can present the adjusted list of user comments to the first user accessing a web page containing the particular web content by displaying the adjusted list of user comments in an inline frame. For example, the comment hosting process can present the adjusted list of user comments to the first user accessing a web page containing a news feed by passing the adjusted list of user comments to news feed engine 110 to be included in the news feed.

In particular embodiments, an administrator of third party website 130 or the social networking system may moderate comments. In one implementation, the comment hosting process may allow administrator access to comment threads associated with a third party web site. In some implementations, the comment thread identifiers may also include, or be associated with, information identifying a web domain. The social networking system may allow administrators associated with a given web domain to access comment threads associated with the web domain. For example, a third party website administrator may modify one or more privacy settings of a user comment in comment database 105. In particular embodiments, an administrator of third party website 130 or the social networking system may moderate user comments of a particular web content of third party website 130 by modifying privacy settings of user comments of the particular web content. In this manner, a third party administrator may be able to individually control which comments can be accessed by users generally as opposed to a more limited set of users. In some embodiments, the administrator may delete a particular user comment from public view by modifying the privacy setting of the particular user comment as only viewable to first-degree friends of the author of the particular user comment. In other embodiments, the administrator may delete a particular user comment from public view by modifying the privacy setting of the particular user comment as only accessible to the administrator. In particular embodiments, the administrator can black list a particular user by modifying privacy settings of every user comments by the particular user as only accessible to the particular user. In some implementations, comments submitted by a first user may by default be viewable only by first degree friends of the first user until a third party web site administrator has had a chance to review the comment and make the comment accessible to all users. In this manner, comments which may not be appropriate for a more public or general audience can nevertheless be made available to first degree friends of the user. In other implementations, comments by default may be accessible to everyone. An administrator may change the privacy setting of the user comment to be viewable only by the commenting user or the first degree friends of the user.

Figure 6:
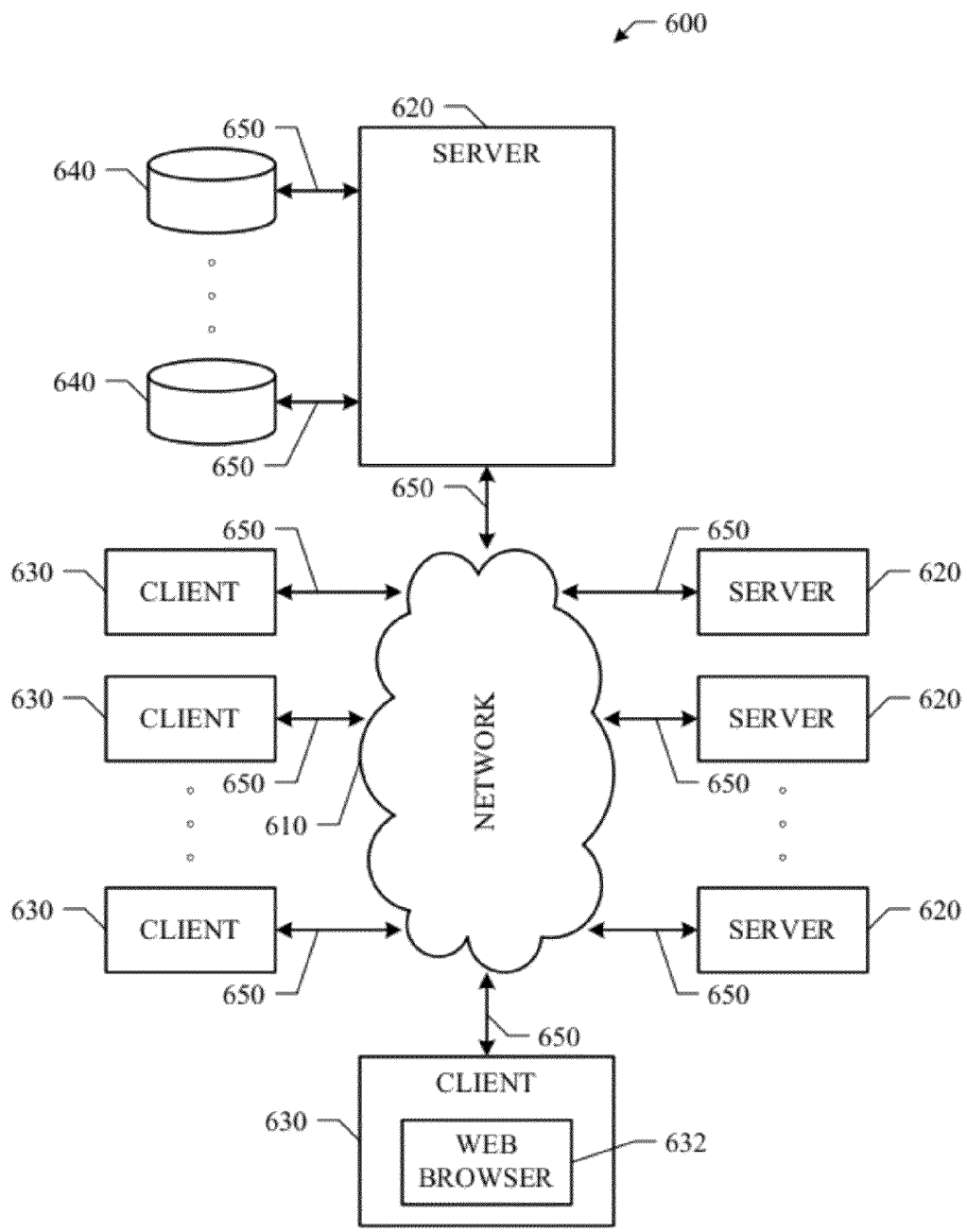
FIG. 6 illustrates an example network environment.

While the foregoing embodiments may be implemented in a variety of network configurations, the following illustrates an example network environment for didactic, and not limiting, purposes. FIG. 6 illustrates an example network environment 600. Network environment 600 includes a network 610 coupling one or more servers 620 and one or more clients 630 to each other. Network environment 600 also includes one or more data storage 640 linked to one or more servers 620. Particular embodiments may be implemented in network environment 600. For example, social networking system frontend 120 may be written in software programs hosted by one or more servers 620. For example, event database 102 may be stored in one or more storage 640. In particular embodiments, network 610 is an intranet, an extranet, a virtual private network (VPN), a local area network (LAN), a wireless LAN (WLAN), a wide area network (WAN), a metropolitan area network (MAN), a portion of the Internet, or another network 610 or a combination of two or more such networks 610. The present disclosure contemplates any suitable network 610.

One or more links 650 couple a server 620 or a client 630 to network 610. In particular embodiments, one or more links 650 each includes one or more wired, wireless, or optical links 650. In particular embodiments, one or more links 650 each includes an intranet, an extranet, a VPN, a LAN, a WLAN, a WAN, a MAN, a portion of the Internet, or another link 650 or a combination of two or more such links 650. The present disclosure contemplates any suitable links 650 coupling servers 620 and clients 630 to network 610.

In particular embodiments, each server 620 may be a unitary server or may be a distributed server spanning multiple computers or multiple datacenters. Servers 620 may be of various types, such as, for example and without limitation, web server, news server, mail server, message server, advertising server, file server, application server, exchange server, database server, or proxy server. In particular embodiments, each server 620 may include hardware, software, or embedded logic components or a combination of two or more such components for carrying out the appropriate functionalities implemented or supported by server 620. For example, a web server is generally capable of hosting websites containing web pages or particular elements of web pages. More specifically, a web server may host HTML files or other file types, or may dynamically create or constitute files upon a request, and communicate them to clients 630 in response to HTTP or other requests from clients 630. A mail server is generally capable of providing electronic mail services to various clients 630. A database server is generally capable of providing an interface for managing data stored in one or more data stores.

In particular embodiments, one or more data storages 640 may be communicatively linked to one or more servers 620 via one or more links 650. In particular embodiments, data storages 640 may be used to store various types of information. In particular embodiments, the information stored in data storages 640 may be organized according to specific data structures. In particular embodiment, each data storage 640 may be a relational database. Particular embodiments may provide interfaces that enable servers 620 or clients 630 to manage, e.g., retrieve, modify, add, or delete, the information stored in data storage 640.

In particular embodiments, each client 630 may be an electronic device including hardware, software, or embedded logic components or a combination of two or more such components and capable of carrying out the appropriate functions implemented or supported by client 630. For example and without limitation, a client 630 may be a desktop computer system, a notebook computer system, a netbook computer system, a handheld electronic device, or a mobile telephone. The present disclosure contemplates any suitable clients 630. A client 630 may enable a network user at client 630 to access network 630. A client 630 may enable its user to communicate with other users at other clients 630.

A client 630 may have a web browser 632, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at client 630 may enter a Uniform Resource Locator (URL) or other address directing the web browser 632 to a server 620, and the web browser 632 may generate a Hyper Text Transfer Protocol (HTTP) request and communicate the HTTP request to server 620. Server 620 may accept the HTTP request and communicate to client 630 one or more Hyper Text Markup Language (HTML) files responsive to the HTTP request. Client 630 may render a web page based on the HTML files from server 620 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 7:
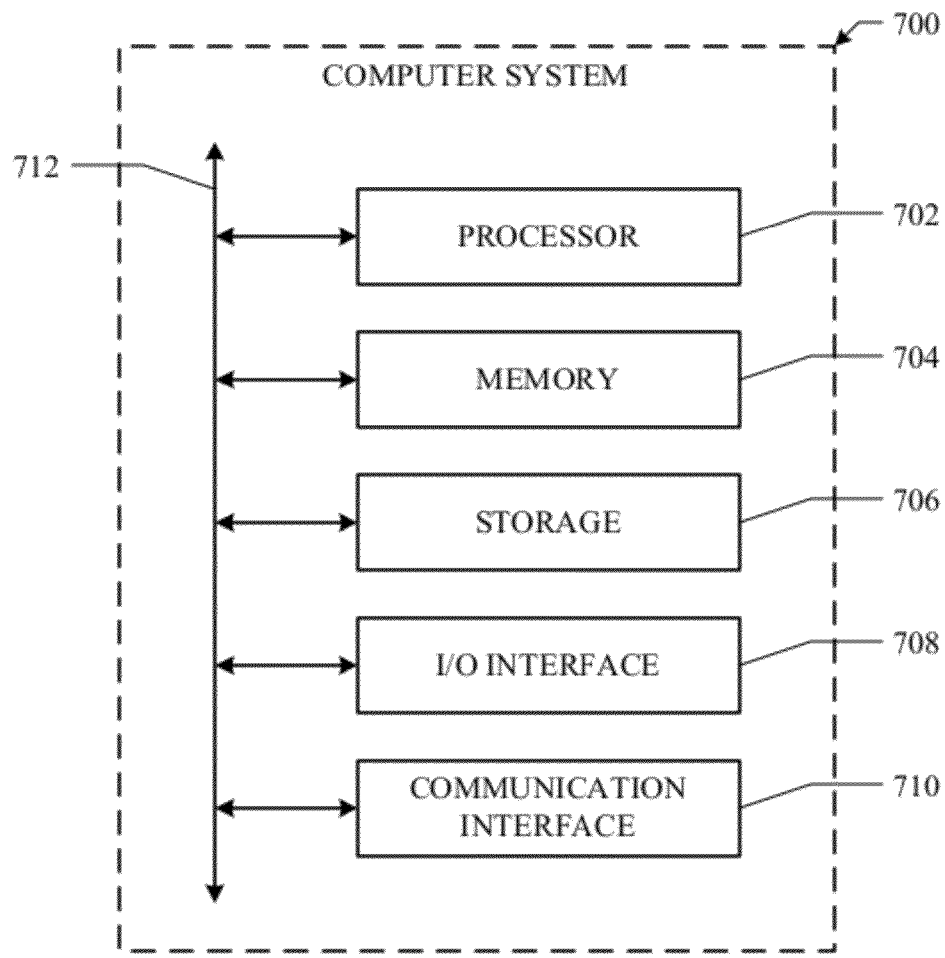
FIG. 7 illustrates an example computer system.

FIG. 7 illustrates an example computer system 700, which may be used with some embodiments of the present invention. This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. The present disclosure contemplates processor 702 including any suitable number of any suitable internal caches, where appropriate. As an example and not by way of limitation, processor 702 may include one or more instruction caches, one or more data caches, and one or more translation look-aside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. The present disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 704 may include one or more memories 702, where appropriate. Although this disclosure describes and illustrates particular memory, this disclosure contemplates any suitable memory.

In particular embodiments, storage 706 includes mass storage for data or instructions. As an example and not by way of limitation, storage 706 may include an HDD, a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 702 (such as, for example, one or more internal registers or caches), one or more portions of memory 704, one or more portions of storage 706, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
   by one or more computing devices associated with a social-networking system, receiving a request to store a user comment associated with content on a third-party web site hosted by a third-party system, the third-party system being separate from the social-networking system, the content comprising media,
   wherein the request comprises a first URL that references a web site of the social-networking system, and the first URL comprises a second URL that references the third-party web site and comprises a content identifier for the content; and
   by one or more computing devices associated with the social-networking system, storing the user comment in a data store of the social-networking system in association with the second URL that references the third-party web site and comprises the content identifier for the content.

2. The method of claim 1, wherein the media comprises:
   text;
   one or more images;
   one or more videos; or
   one or more games.

3. The method of claim 1, further comprising assigning one or more privacy settings to the user comment.

4. The method of claim 3, further comprising moderating the user comment by modifying one or more of the privacy settings.

5. The method of claim 3, wherein assigning privacy settings to the user comment comprises:
   assigning a default privacy setting to the user comment; and
   allowing an administrator to change the privacy setting of the user comment.

6. The method of claim 1, further comprising configuring a news-feed item in response to the user comment.

7. The method of claim 6, wherein the news-feed item comprises a portion of the content and one or more user comments associated with the content.

8. The method of claim 6, further comprising receiving a user comment corresponding to the news-feed item and storing the user comment in association with the content identifier.

9. One or more computing devices collectively comprising:
   one or more processors; and
   one or more memory devices coupled to the processors comprising instructions that are executable by the processors, the processors being collectively operable when executing the instructions to:
   receive a request to store a user comment associated with content on a third-party web site hosted by a third-party system, the third-party system being separate from a social-networking system, the content comprising media,
   wherein the request comprises a first URL that references a web site of the social-networking system, and the first URL comprises a second URL that references the third-party web site and comprises a content identifier for the content; and
   store the user comment in a data store of the social-networking system in association with the second URL that references the third-party web site and comprises the content identifier for the content;
   wherein the computing devices are associated with the social-networking system.

10. The computing devices of claim 9, wherein the media comprises:
    text;
    one or more images;
    one or more videos; or
    one or more games.

11. The computing devices of claim 9, wherein the processors are collectively operable when executing the instructions to assign one or more privacy settings to the user comment.

12. The computing devices of claim 11, wherein the processors are collectively operable when executing the instructions to moderate the user comment by modifying one or more of the privacy settings of the user comment.

13. The computing devices of claim 11, wherein assigning privacy settings to the user comment comprises:
    assigning a default privacy setting to the user comment; and
    allowing an administrator to change the privacy setting of the user comment.

14. The computing devices of claim 9, wherein the processors are collectively operable when executing the instructions to configure a news-feed item in response to the user comment.

15. The computing devices of claim 14, wherein the news-feed item comprises a portion of the content and one or more user comments associated with the content.

16. The computing devices of claim 14, wherein the processors are collectively operable when executing the instructions to receive a user comment corresponding to the news-feed item and store the user comment in association with the content identifier.

17. One or more computer-readable non-transitory storage media embodying software that is configured when executed to:
    receive a request to store a user comment associated with content on a third-party web site hosted by a third-party system, the third-party system being separate from a social-networking system, the content comprising media, wherein the request comprises a first URL that references a web site of the social-networking system, and the first URL comprises a second URL that references the third-party web site and comprises a content identifier for the content; and store the user comment in a data store of the social-networking system in association with the second URL that references the third-party web site and comprises the content identifier for the content;

wherein the computer-readable non-transitory storage means and the software are associated with the social-networking system.

18. The media of claim 17, wherein the content identifier is unique to the content.

19. The media of claim 17, wherein the software is further configured to assign one or more privacy settings to the user comment.

20. The media of claim 19, wherein the software is further configured to moderate the user comment by modifying one or more of the privacy settings of the user comment.

21. The media of claim 19, wherein assigning privacy settings to the user comment comprises:
  assigning a default privacy setting to the user comment; and
  allowing an administrator to change the privacy setting of the user comment.

22. The media of claim 17, wherein the software is further configured to configure a news-feed item in response to the user comment.

23. The media of claim 22, wherein the news-feed item comprises a portion of the content and one or more user comments associated with the content.

24. The media of claim 22, wherein the software is further configured to receive a user comment corresponding to the news feed item and store the user comment in association with the content identifier.

25. The method of claim 1, wherein the user comment was entered on the third-party web site by a user of the social-networking system through an inline-frame element presented within a web page of the third-party web site, the inline-frame element being hosted by the social-networking system.

26. The computing devices of claim 9, wherein the user comment was entered on the third-party web site by a user of the social-networking system through an inline-frame element presented within a web page of the third-party web site, the inline-frame element being hosted by the social-networking system.

27. The media of claim 17, wherein the user comment was entered on the third-party web site by a user of the social-networking system through an inline-frame element presented within a web page of the third-party web site, the inline-frame element being hosted by the social-networking system.

* * * * *